(12) United States Patent
Sims

(10) Patent No.: US 7,039,273 B2
(45) Date of Patent: May 2, 2006

(54) SOLDER SEALS WITHIN A SWITCHING SYSTEM

(76) Inventor: Tyler Sims, 1041 Blinken St., Knoxville, TN (US) 37932

( * ) Notice: Subject to any disclaimer, the term of this patent is extended or adjusted under 35 U.S.C. 154(b) by 32 days.

(21) Appl. No.: 10/639,320

(22) Filed: Aug. 12, 2003

(65) Prior Publication Data

US 2005/0036733 A1    Feb. 17, 2005

(51) Int. Cl.
*G02B 6/26* (2006.01)
(52) U.S. Cl. .............................. 385/28; 385/14; 385/15
(58) Field of Classification Search .................. 385/14, 385/15, 39
See application file for complete search history.

(56) References Cited

U.S. PATENT DOCUMENTS

| | | | | |
|---|---|---|---|---|
| 4,754,141 | A * | 6/1988 | Mindock | 250/343 |
| 5,253,010 | A * | 10/1993 | Oku et al. | 396/542 |
| 5,656,507 | A * | 8/1997 | Welbourn et al. | 385/14 |
| 5,675,684 | A * | 10/1997 | Hirataka et al. | 385/88 |
| 5,699,462 | A | 12/1997 | Fouquet et al. | |
| 6,195,478 | B1 | 2/2001 | Fouquet | |
| 6,320,994 | B1 | 11/2001 | Donald et al. | |
| 6,324,316 | B1 | 11/2001 | Fouquet et al. | |
| 6,487,333 | B1 | 11/2002 | Fouquet et al. | |
| 2003/0026522 | A1* | 2/2003 | Chiaretti | 385/15 |
| 2003/0110788 | A1* | 6/2003 | Koeneman et al. | 62/259.2 |
| 2004/0100689 | A1* | 5/2004 | Fasham et al. | 359/344 |

* cited by examiner

*Primary Examiner*—Kaveh Kianni

(57) ABSTRACT

A silicon chip is attached to a planar light circuit. A recessed moat is formed around an output perimeter of a surface of the silicon chip. When soldering the silicon chip to the planar light circuit, the recessed moat is filled with solder.

12 Claims, 7 Drawing Sheets

SOLDER SEALS WITHIN A SWITCHING SYSTEM

BACKGROUND

The present invention concerns fluid systems and pertains particularly to solder seals for use within a switch system.

Optical fibers provide significantly higher data rates than electronic paths. However, effective utilization of the greater bandwidth inherent in optical signal paths requires optical cross-connect switches.

One type of optical cross-connect utilizes total internal reflection (TIR) switching elements. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

One type of TIR element is taught in U.S. Pat. No. 5,699,462 which is hereby incorporated by reference. The TIR taught in this patent utilizes thermal activation to displace liquid from a gap at the intersection of a first optical waveguide and a second optical waveguide. In this type of TIR, a trench is cut through a waveguide. The trench is filled with an index-matching liquid. A bubble is generated at the cross-point by heating the index matching liquid with a localized heater. The bubble must be removed from the crosspoint to switch the cross-point from the reflecting to the transmitting state and thus change the direction of the output optical signal. Purity of the liquid and near absolute cleanliness within the assembled package is necessary for optimal performance and longevity of the TIR elements.

SUMMARY OF THE INVENTION

In accordance with the preferred embodiment, a silicon chip is attached to a planar light circuit. A recessed moat is formed around an output perimeter of a surface of the silicon chip. When soldering the silicon chip to the planar light circuit, the recessed moat is filled with solder.

DESCRIPTION OF THE PREFERRED EMBODIMENT

Figure 1:
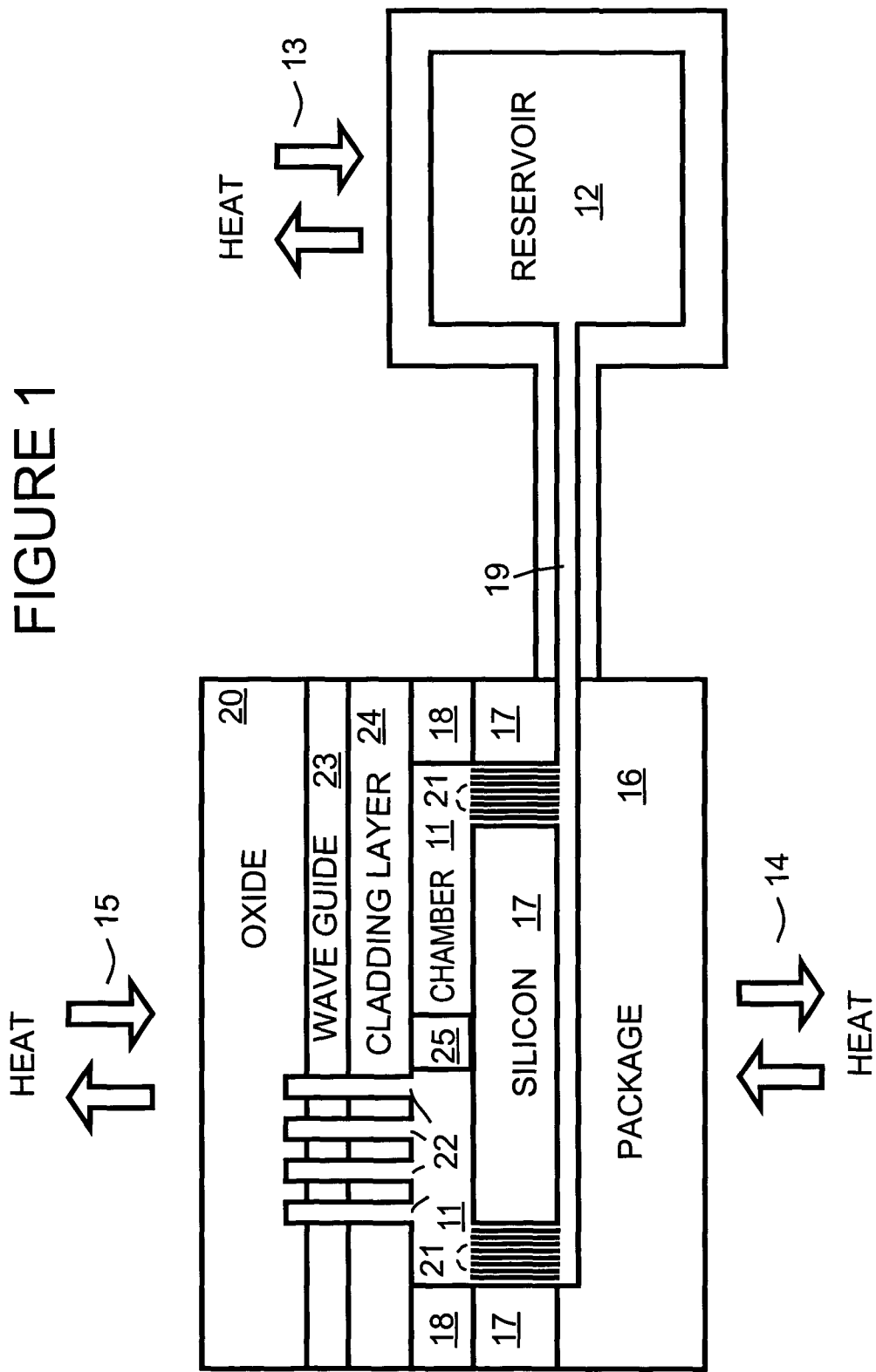
FIG. 1 is a simplified illustration of a cross-section of an optical switch system in accordance with a preferred embodiment of the present invention.

FIG. 1 is a simplified cross section of an optical switch system, not to scale. On package 16 is connected a silicon chip 17. For example package 16 is composed of molybdenum, silicon or some other material. A planar light circuit (PLC), consisting of a cap 20, a waveguide 23 and a cladding layer 24, is attached to package 16 via solder areas 18 and solder bars represented in FIG. 1 by a solder bar 25. Cap 20 is composed of, for example, oxide or quartz. Trenches 22 are representative of one or thousands of trenches used for optical switching. The trenches penetrate through cladding layer 24 through waveguide area 23 and into cap 20.

A reservoir 12 stores liquid used for optical switching. Fluid is transferred through a conduit 19 to a chamber 11. The fluid enters chamber 11 through filaments 21 in silicon chip 17. There may be hundreds or thousands of filaments placed as needed throughout silicon chip 17.

Fluid in the form of vapor and liquid is transported, with the use of heat, between reservoir 12, chamber 11 and trenches used for optical switching. Arrows 13, arrows 14 and arrows 15 represent the application and removal of heat at various locations to facilitate transport of fluid in the system.

Heat is added to reservoir 13 so that vapor will be transported from reservoir 12 through conduit 19 to chamber 11. After the vapor enters chamber 11 through the filaments, the vapor begins to condense.

Figure 2:
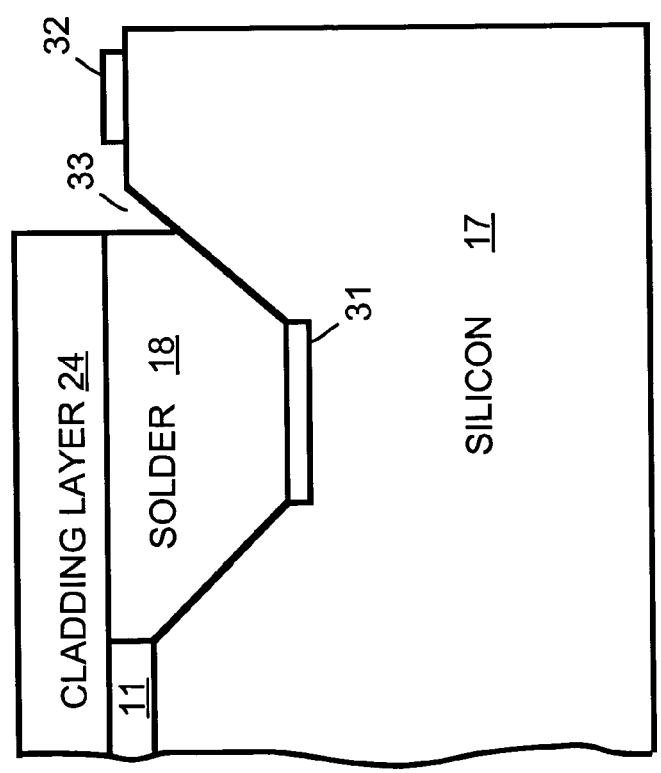
FIG. 2 illustrates use of a recessed silicon moat to simplify the bonding of a planar light circuit (PLC) and a silicon chip in accordance with a preferred embodiment of the present invention.

FIG. 2 illustrates use of a recessed silicon moat 33 around the entire perimeter of silicon chip 17 used to simply the bonding of cladding layer 24 of the PLC to silicon chip 17. A bonding pad 32 is shown located outside the bonded area. Solder 18 within silicon moat 33 seals fluid within chamber 11, as shown.

Recessed silicon moat 33 can be formed, for example, using oxide masking followed by Tetra Methyl Ammonium Hydroxide (TMAH) or Potassium Hydroxide (KOH) silicon etching. A heating region 31 can be placed within silicon moat 33 to assist in local bonding, e.g., for solder heating and solder wetting upon attach. Heating region 31 can also be used during operation of the optical switch system for the purpose of gettering impurities within chamber 11. Heating region 31 can be implemented, for example, as a diffusion well or as a low level metal resistor.

Alternatively, for an SOI wafer, recessed silicon moat 33 can be formed during front and backside processing. In this case, silicon moat 33 is etched and heating region 31 is formed on the same side as FET circuit logic. A flip chip or through via connections are used to make connections to heating region 31 and the FET circuit logic.

Figure 3:
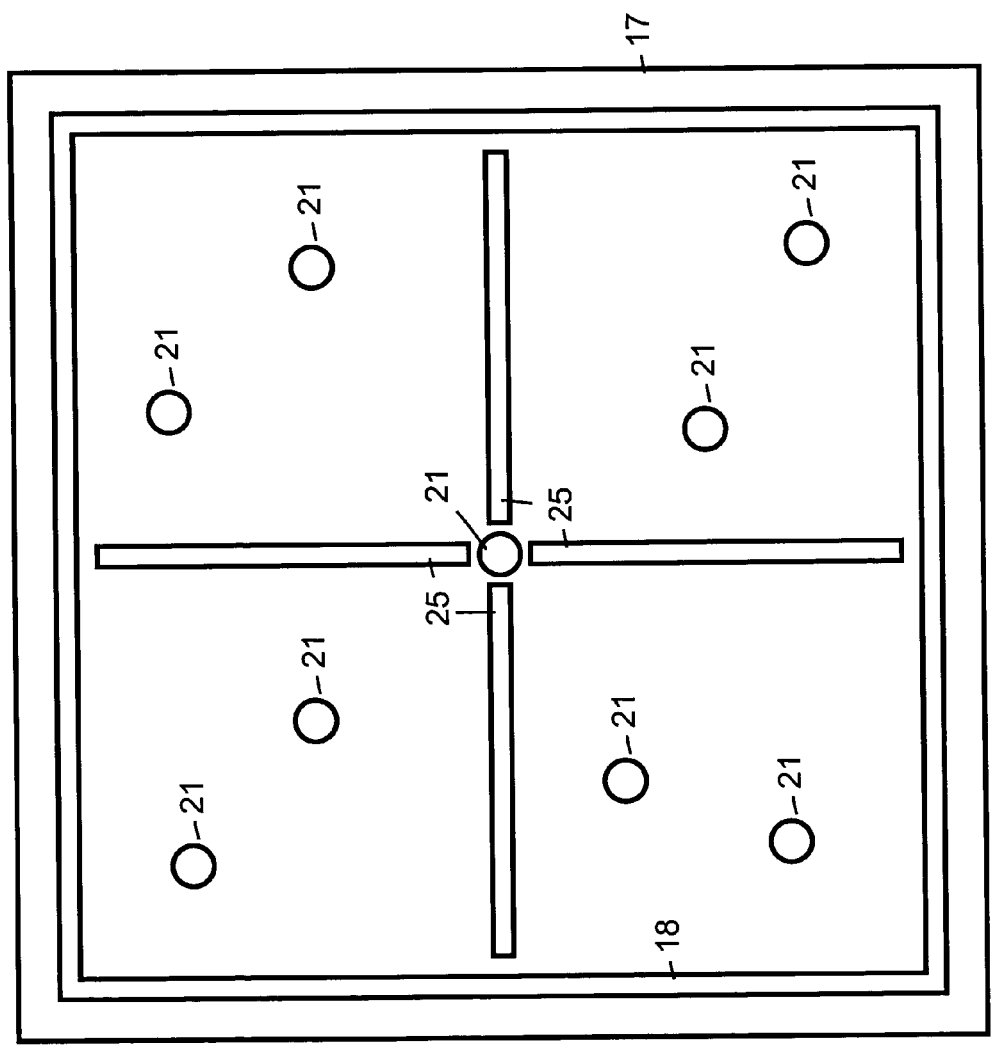
FIG. 3 shows use of solder bars to stabilize connection between a planar light circuit (PLC) and a silicon chip in accordance with a preferred embodiment of the present invention.

FIG. 3 shows use of solder bars to stabilize connection between the PLC and silicon chip 17. To illustrate this, a simplified top view of silicon chip 17 is shown without the attached PLC.

FIG. 3 shows solder 18 used to form a seal around the perimeter of silicon chip 17. Solder bars 25 are used to prevent bowing of the PLC and to increase uniformity of the gap between the PLC and silicon chip 17. Regions of filaments 21 are shown placed throughout silicon chip 17.

FIG. 3 is only illustrative. For example, solder bars 25 are shown dividing silicon chip 17 into four quadrants. Additional or fewer solder bars can be placed at various locations on silicon chip, as necessary, to prevent bowing of the PLC and to increase uniformity of the gap between the PLC and silicon chip 17. Likewise, the number, size and location of filaments 21 can be varied to allow for optimal performance of the optical switch system.

As illustrated by FIG. 2, heating regions can be placed below or around solder bars 25 to assist in local bonding. The heating regions can be implemented, for example, as a diffusion well or as a low level metal resistor. The heating regions can also be used during operation of the optical switch system for the purpose of gettering impurities.

Recessing within the PLC can also be used at soldering locations. Processing the PLC to allow for such recessing is illustrated in FIGS. 4A through 4H and in FIGS. 5A through 5H. The illustrated processes allows for a recessed solder ring while leaving gap filling array of oxide to close the gap.

FIGS. 4A, 4B, 4C, 4D, 4E, 4F, 4G and 4H illustrate processing steps in which a metal ring and solder seal are formed on the PLC in preparation for attachment to silicon chip 17.

Figure 4A:
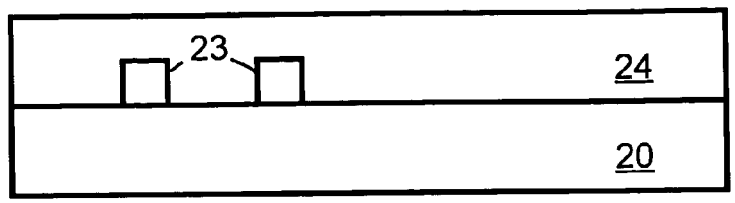
FIGS. 4A, 4B, 4C, 4D, 4E, 4F, 4G and 4H illustrate processing steps in which a metal ring and solder seal are formed on a PLC in preparation for attachment to a silicon chip in accordance with a preferred embodiment of the present invention.

In FIG. 4A, cladding layer 24 is shown placed on cap 20. Within cladding layer 24 are waveguides 23. The cross sectional view of FIG. 4A is perpendicular to the cross sectional view of FIG. 1. Thus in FIG. 4A, only a cross section of waveguide 23 is shown while in FIG. 1, a full length of waveguide 23 is shown.

A chemical mechanical polishing (CMP) of cladding layer 24 is performed to achieve a depth of 8 to 14 micrometers (μm) above the top of waveguides 23.

Figure 4B:
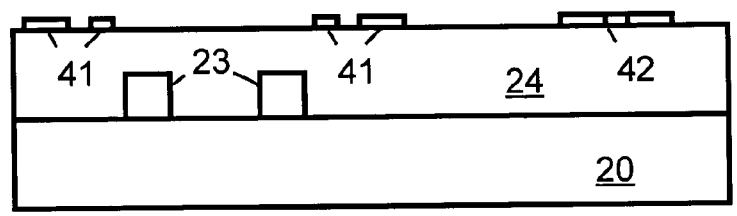

As illustrated by FIG. 4B, alignment marks 41 and wet edge stop 42 are placed on cladding layer 24.

Figure 4C:
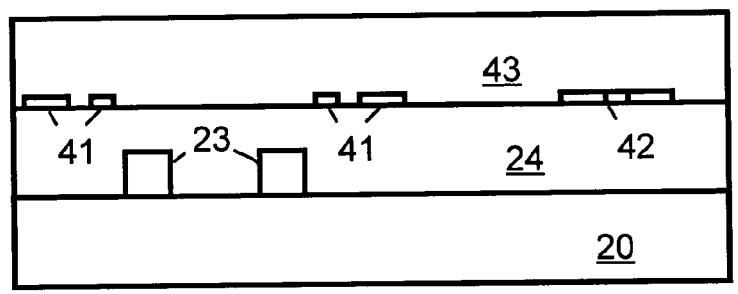

As illustrated by FIG. 4C, a second cladding layer 43 is deposited to a depth of 12 to 20 μm.

Figure 4D:
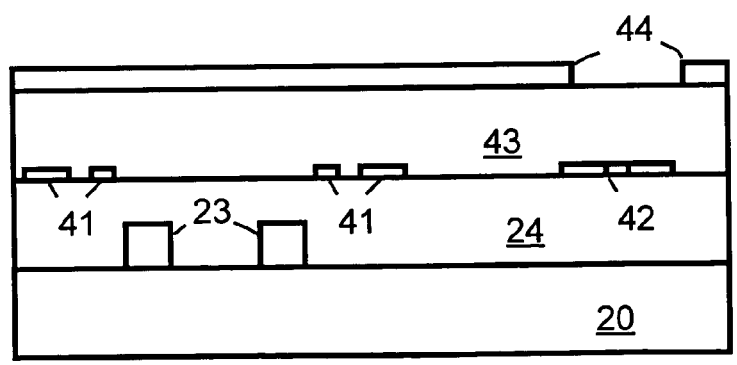

As illustrated by FIG. 4D, a photolithography mask 44 is placed over second cladding layer 43. An opening in the mask is placed over wet edge stop 42.

Figure 4E:
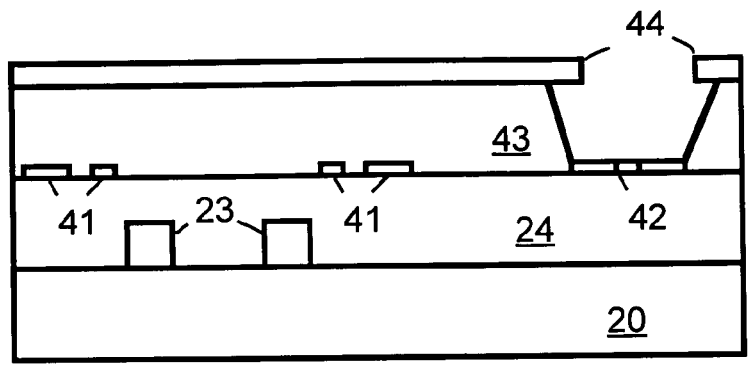

As illustrated by FIG. 4E, an etch is performed. For example, a Buffered Hydrofluoric (BHF) etch is performed at an etch rate of 3 μm per hour. The etching area forms a recessed area as shown.

Figure 4F:
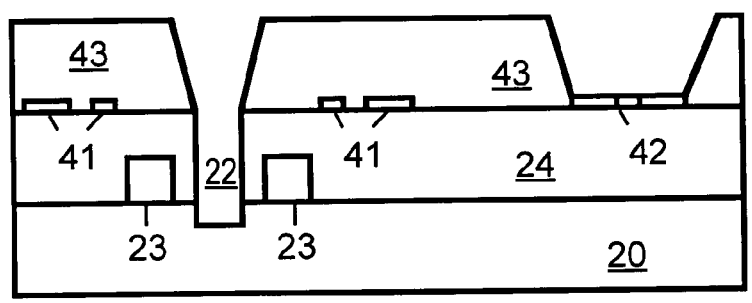

As illustrated by FIG. 4F, photolithography mask 44 is removed and trench 22 is etched.

Figure 4G:
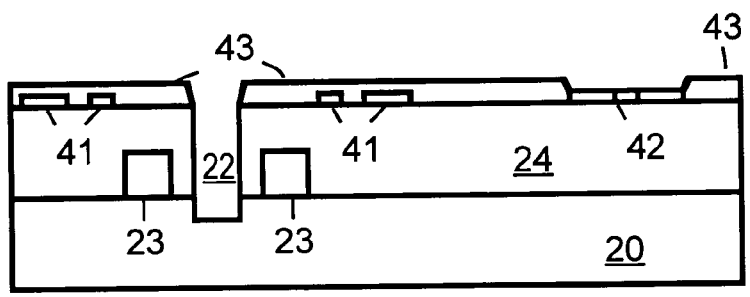

As illustrated by FIG. 4G, cladding layer 43 is etched to a depth of approximately 8 to 14 μm.

Figure 4H:
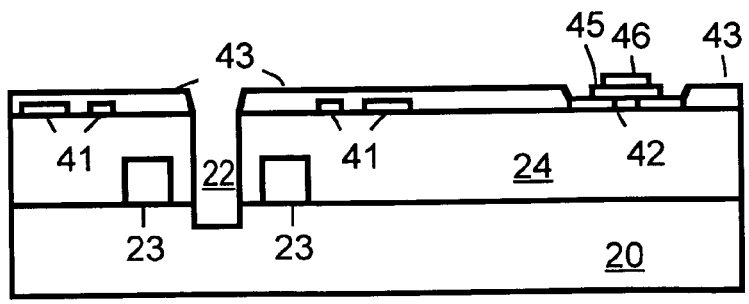

As illustrated by FIG. 4H, a metal ring 45 and a solder ring 46 are formed over wet edge stop 42.

FIGS. 5A, 5B, 5C, 5D, 5E, 5F, 5G and 5H illustrate processing steps in which a metal ring and solder seal are formed on the PLC in preparation for attachment to silicon chip 17 in another embodiment of the present invention.

Figure 5A:
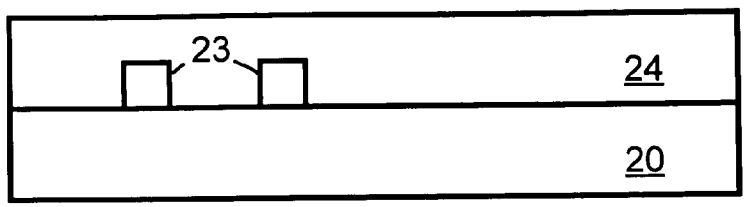
FIGS. 5A, 5B, 5C, 5D, 5E, 5F, 5G and 5H illustrate processing steps in which a metal ring and solder seal are formed on a PLC in preparation for attachment to a silicon chip in accordance with another preferred embodiment of the present invention.

In FIG. 5A, cladding layer 24 is shown placed on cap 20. Within cladding layer 24 are waveguides 23. The cross sectional view of FIG. 5A is perpendicular to the cross sectional view of FIG. 1.

A CMP polishing of cladding layer 24 is performed to achieve a depth of 8 to 14 micrometers (μm) above the top of waveguides 23.

Figure 5B:
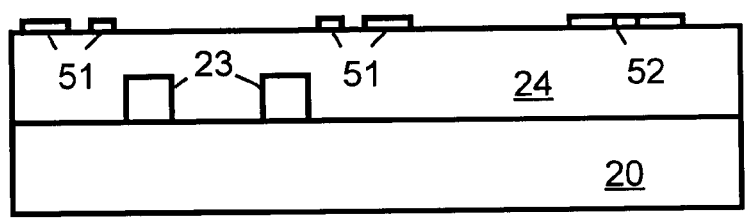

As illustrated by FIG. 5B, alignment marks 51 and wet edge stop 52 are placed on cladding layer 24.

Figure 5C:
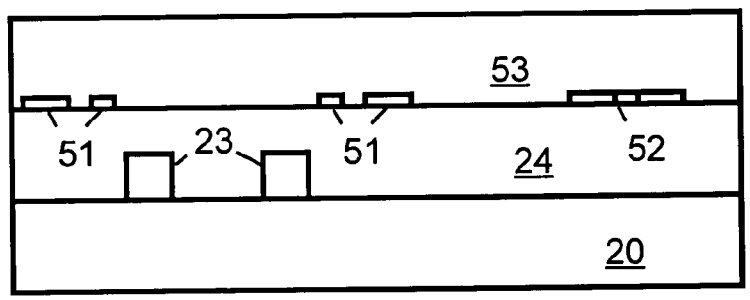

As illustrated by FIG. 5C, a second cladding layer 53 is deposited to a depth of 12 to 20 μm.

Figure 5D:
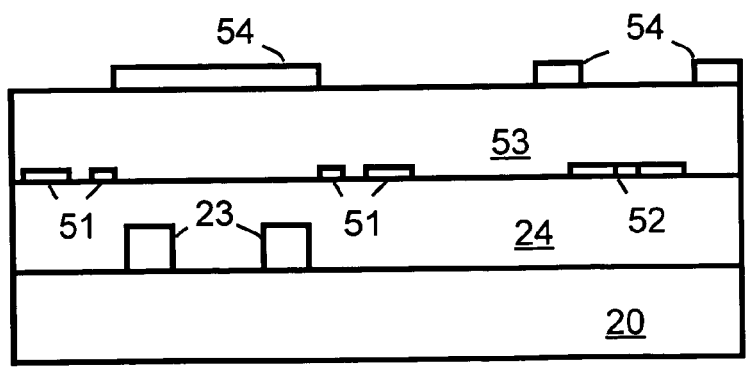

As illustrated by FIG. 5D, a photolithography mask 54 is placed over second cladding layer 53. An opening in the mask is placed over wet edge stop 52. Additional openings within mask 54 are also present, as shown.

Figure 5E:
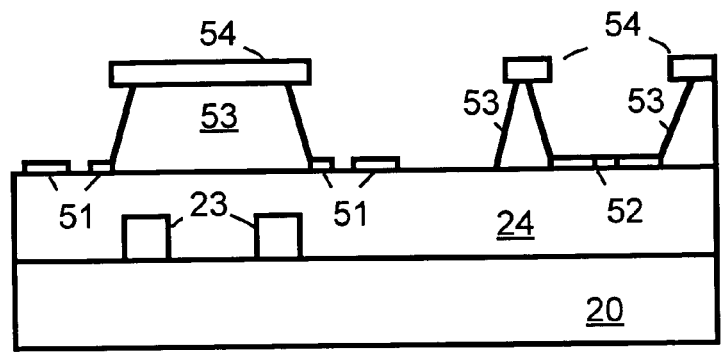

As illustrated by FIG. 5E, an etch is performed. For example, a BHF etch is performed at an etch rate of 3 μm per hour. The etching area forms recessed areas as shown.

Figure 5F:
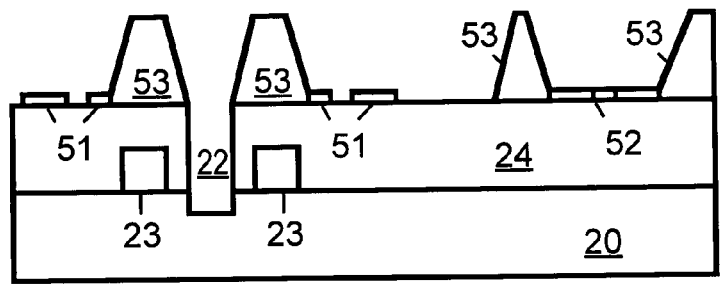

As illustrated by FIG. 5F, photolithography mask 54 is removed and trench 22 is etched.

Figure 5G:
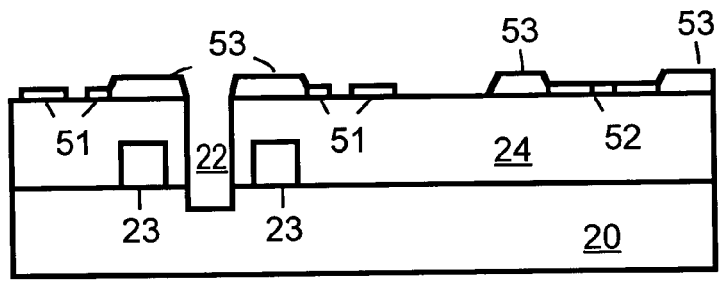

As illustrated by FIG. 5G, remaining portions of cladding layer 53 are etched to a depth of approximately 8 to 14 μm.

Figure 5H:
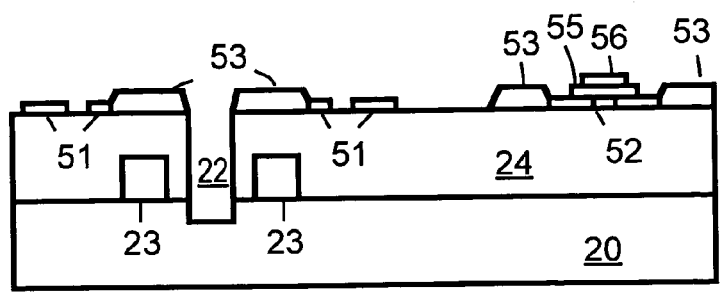

As illustrated by FIG. 5H, a metal ring 55 and a solder ring 56 are formed over wet edge stop 52.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for attaching a silicon chip to a planar light circuit comprising the following steps:
    (a) forming a recessed moat around an output perimeter of a surface of the silicon chip; and,
    (b) soldering the silicon chip to the planar light circuit, including:
        filling the recessed moat with solder so that the solder seals fluid within a chamber formed when the silicon chip is soldered to the planar light circuit.

2. A method as in claim 1 wherein step (b) additionally includes:
    using additional solder bars to attach the silicon chip to the planar light circuit.

3. A method as in claim 1 additionally comprising the following step performed before step (b):
    forming recessed areas in the planar light circuit at locations where the planar light circuit is to be soldered to the silicon chip.

4. A method for attaching a silicon chip to a planar light circuit comprising the following:
    (a) forming a recessed moat around an output perimeter of a surface of the silicon chip; and,
    (b) soldering the silicon chip to the planar light circuit, including:
        filling the recessed moat with solder, and
        heating the solder with a heating region located within the recessed moat.

5. A method as in claim 4 wherein the heating region is composed of a diffusion well.

6. A method as in claim 4 wherein the heating region is composed of a metal resistor.

7. A switching device comprising:
    a silicon chip including a recessed moat around an output perimeter of a surface of the silicon chip; and,
    a planar light circuit attached to the silicon chip;
    wherein the recessed moat within the silicon chip is filled with solder, the solder being used to attach the planar light circuit to the silicon chip so that the solder seals fluid within a chamber formed when the silicon chip is attached to the planar light circuit.

8. A switching device as in claim 7 additionally comprising additional solder bars used to attach the silicon chip to the planar light circuit.

9. A switching device as in claim 7 wherein the planar light circuit includes recessed areas at locations where the planar light circuit is soldered to the silicon chip.

10. A switching device comprising:

a silicon chip including a recessed moat around an output perimeter of a surface of the silicon chip; and, a planar light circuit attached to the silicon chip;

wherein the recessed moat within the silicon chip is filled with solder, the solder being used to attach the planar light circuit to the silicon chip; and, wherein the silicon chip includes a heating region located within the recessed moat.

11. A switching device as in claim 10 wherein the heating region is composed of a diffusion well.

12. A switching device as in claim 10 wherein the heating region is composed of a metal resistor.

* * * * *